(12) United States Patent
Patton et al.

(10) Patent No.: US 9,367,299 B2
(45) Date of Patent: Jun. 14, 2016

(54) PREVENTING APPLICATION DOWNGRADE IN AN APPLICATION STORE

(71) Applicant: Google Inc., Mountain View, CA (US)

(72) Inventors: Brian Patton, London (GB); Nicolas Fortescue, Oxford (GB); Riccardo Govoni, London (GB); Debashish Chatterjee, Bromley (GB)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/145,326

(22) Filed: Dec. 31, 2013

(65) Prior Publication Data

US 2015/0186128 A1    Jul. 2, 2015

(51) Int. Cl.
G06F 9/45      (2006.01)
G06F 9/445     (2006.01)

(52) U.S. Cl.
CPC ... G06F 8/65 (2013.01); G06F 8/61 (2013.01)

(58) Field of Classification Search
CPC ............. G06F 9/45; G06F 17/30; G06F 8/61; G06F 8/65
See application file for complete search history.

(56) References Cited

U.S. PATENT DOCUMENTS

| 6,687,902 | B1 * | 2/2004 | Curtis | G06F 8/62 717/174 |
| 8,327,351 | B2 | 12/2012 | Paladino et al. | |
| 8,621,450 | B2 | 12/2013 | Firman et al. | |
| 8,667,483 | B2 * | 3/2014 | Coussemaeker | G06F 8/61 717/174 |
| 8,850,422 | B2 * | 9/2014 | Chang | H04L 67/34 717/173 |
| 2003/0037327 | A1 * | 2/2003 | Cicciarelli | G06F 8/61 717/178 |
| 2003/0046681 | A1 * | 3/2003 | Barturen et al. | 717/177 |
| 2003/0217193 | A1 * | 11/2003 | Thurston et al. | 709/321 |
| 2005/0125788 | A1 * | 6/2005 | Lupini | G06F 8/61 717/174 |
| 2005/0132350 | A1 * | 6/2005 | Markley | G06F 8/65 717/168 |
| 2006/0236083 | A1 * | 10/2006 | Fritsch et al. | 713/1 |
| 2008/0022274 | A1 * | 1/2008 | Shieh | G06F 8/61 717/174 |
| 2008/0127170 | A1 * | 5/2008 | Goldman | G06F 8/61 717/174 |
| 2008/0168553 | A1 * | 7/2008 | Kiehtreiber | G06F 21/51 726/17 |
| 2008/0201701 | A1 * | 8/2008 | Hofhansl et al. | 717/168 |

(Continued)

OTHER PUBLICATIONS

Mark Keil et al. "Relative importance of evaluation criteria for enterprise systems: a conjoint study", [Online], 2006, pp. 1-27, [Retrieved fromInternet on Feb. 8, 2016], <http://people.terry.uga.edu/tiwana/pdfs/j/isj2005.pdf>.*

(Continued)

*Primary Examiner* — Thuy Dao
*Assistant Examiner* — Ziaul A Chowdhury
(74) *Attorney, Agent, or Firm* — Morris & Kamlay LLP

(57) ABSTRACT

An application and system are provided that prevent an application repository from accepting a new installation package if the new application installation package would not be successfully installed on devices to which it is directed. The version number and constraints provided with the new application installation package may be compared to that of installation packages already existing or published within the repository to determine whether or not the new installation package will be unreachable by a device group to which it is directed. An indication may be provided if that new installation package is unreachable by at least one device group to which it is directed.

18 Claims, 4 Drawing Sheets

(56) References Cited

U.S. PATENT DOCUMENTS

| | | | | |
|---|---|---|---|---|
| 2008/0301659 A1* | 12/2008 | Rosenberg | G06F 8/65 | 717/168 |
| 2010/0257520 A1* | 10/2010 | Navarro | G06F 8/65 | 717/173 |
| 2010/0306735 A1* | 12/2010 | Hoff | G06F 8/61 | 717/109 |
| 2011/0055155 A1* | 3/2011 | Page et al. | | 707/625 |
| 2012/0036220 A1* | 2/2012 | Dare | G06F 8/61 | 709/217 |
| 2012/0036442 A1* | 2/2012 | Dare et al. | | 715/736 |
| 2012/0102483 A1* | 4/2012 | Goldman | G06F 8/36 | 717/174 |
| 2013/0047036 A1 | 2/2013 | Pechanec et al. | | |
| 2013/0104114 A1 | 4/2013 | Reiss et al. | | |
| 2013/0139139 A1* | 5/2013 | Mallur et al. | | 717/170 |

OTHER PUBLICATIONS

K Maly et al., "Synchronization and Multiple Group Server Support for Kepler", [Online], 2006, pp. 1-8, [Retrived from Internet on Feb. 8, 2016], <http://www.cs.odu.edu/~maly/papers/publications/iceiscypruskepler06.pdf>.*

Siew Kien Sia et al., "An Assessment of Package-Organisation Misalignment Institutional and Ontological Structures", [Online], 2007, pp. 1-33, [Retrieved from Internet on Feb. 8, 2016], <https://www.researchgate.net/profile/Siew_Sia/publication/220393060.pdf>.*

Hongbo Tian et al., "A Novel Software Deployment Method based on Installation Packages", [Online], 2010 pp. 228-233, [Retrieved from Internet on Feb. 8, 2016], <http://ieeexplore.ieee.org/stamp/stamp.jsp?tp=&arnumber=5562875>.*

Gilbert et al.,"Vision: Automated Security Validation of Mobile Apps at App Markets", Proceeding MCS '11 Proceedings of the second international workshop on Mobile cloud computing and services, pp. 21-26, Dec. 31, 2011.

* cited by examiner

PREVENTING APPLICATION DOWNGRADE IN AN APPLICATION STORE

BACKGROUND

When an application developer publishes changes to a media or application store, the new version or configuration often may be validated to ensure that it does not result in any class of devices being assigned a version of the application which they cannot install or which is not the version best-suited to their device's configuration (e.g., considering screen size, resolution, etc.). Some application packages may be directed to classes of devices based on OS/API level, native platforms, device features, screen sizes, OpenGL textures, OpenGL Embedded Systems ("Open GL ES") version, and other characteristics.

BRIEF SUMMARY

According to an implementation of the disclosed subject matter, a new application installation package with a version number and at least one constraint for an application may be received by an application repository. The at least one constraint may direct the new application installation package to at least one device group. The version number and the at least one constraint of the new application installation package may be compared to at least one application installation package in the application repository. The new application installation package may be determined to be unreachable by at least one device group to which it is directed based on the comparison of the version number and the at least one constraint of the new application installation package to the at least one application installation package in the application repository. An indication may be provided that the new application installation package is unreachable by at least one device group to which it is directed.

In an implementation, a system is provided that includes a repository and a processor. The repository may include one or more application installation packages for one or more applications. The processor may be connected to the repository and configured to receive a new application installation package with a version number and at least one constraint for one of the applications. The at least one constraint may direct the new application installations package to at least one device group. The processor may compare the version number and the at least one constraint of the new application installation package to at least one application installation package related to the new application installation package in the repository. The processor may determine that the new application installation package is unreachable by at least one device group to which it is directed based on the comparison of the version number and the at least one constraint of the new application package to the at least one application installation package in the repository. The processor may be configured to provide an indication that the new application installation package is unreachable by at least one device group to which it is directed.

An advantage of the disclosed system and methods is that specific types of errors may be identified (e.g., an application downgrade, a shadowed installation package, an API level inversion, a native platform inversion, a loss of support for a type of device, a reduction in the type of device supported, etc.). An error message may be generated and provided to a developer so that the error can be quickly overcome. In some configurations the system may automatically correct the error. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
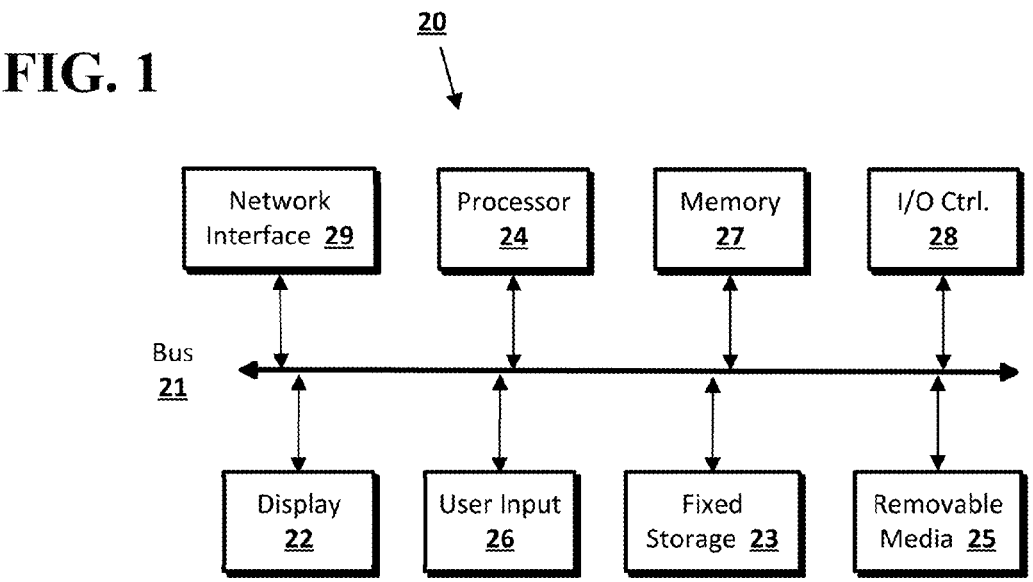
FIG. 1 shows a computer according to an implementation of the disclosed subject matter.

A media/application store may consider a device's characteristics and select the highest version code for which the device is eligible. Examples of scenarios that may be validated include: a downgrade which would result in unsuccessful installation, an application package shadowing, an application programming interface ("API") level inversion, and/or a native platform inversion. Application package shadowing may refer to an instance where all devices that might download a particular application package would instead get a higher-version application package.

API level inversion may refer to an instance where an application package with a lower version code is directed to devices which support higher API levels and another application package is directed to devices which support lower API levels. An API level may refer to APIs that a particular version of an operating system provides. Generally, newer operating systems provide APIs with performance enhancements for existing features of the operating system or that provide new capabilities such as when a new feature is supported by the operating system. For example, version 10 of an application may support API levels 15 and up while version 20 of the application may support API levels from 10-16. A device on which version 20 of the application exists that upgrades (i.e., receives an operating system upgrade or update) to API level 17 will be forced to move to application version 10, because version 20 of the application does not support API levels above 16. That is, the device may receive a lower version of an application (e.g., the device may move from version 20 to version 10 of the application) due to the inverted API constraints.

A native platform inversion may refer to an instance where an application package which runs on one type of processor has a lower version code than an application package which can run on a different type of processor. Examples of shadowing, API level inversion, native platform inversion, and an application downgrade are provided below. Other types of validation may exist than those explicitly disclosed here and they may seek to provide a user's device with the best possible application package and the media/application store's data will grow in a monotonically increasing, consistent state. The best possible application may refer to an application package that is the most compatible with the device based on its hardware (e.g., processor, sensors, screen size/resolution, etc.) and software (e.g., Operating System ("OS") components. Errors detected may be reported with sufficient detail that application developers can understand the issue and resolve it themselves. A developer or user may also be able to observe validation errors as they occur (e.g., when the developer uploads a new version to the system).

As disclosed herein, the validation of an addition of a new application installation package to a media/application store may be performed by recursively validating various levels of a tree corresponding to application package versions that are or will be published. The nodes within the layer represent various incoming constraints and shadowing application package configurations. Incoming constraints may describe a theoretical class of devices which might have installed the application. The shadowing application packages may aid in determining whether the current node represents a downgrade or a suboptimal version being served to a particular class of devices. A cache of which incoming constraints and shadowing application packages nodes have been visited may increase the speed with which a new version of an application installation package may be validated. Errors and warnings may be accumulated while exploring the validation tree and, in some cases, de-duplicated/aggregated to a maximal error and/or warning message at the end of the exploration, to yield an improved user experience. In some configurations, errors and/or warnings may be returned directly without aggregation.

As an example, an application version, such as version 10, for a first version of an OS may match API levels 15 and up, i.e., the application may use, require, or otherwise call functions defined in version 15 or higher of the API. In some cases, such an application may not be suitable for installation on, or execution by, a device running an OS having an API with a lower version, which may not have the same implemented functionality. An application version, such as application version 20, for a second version of the OS may match API levels 13 and up. Application version 20 completely shadows application version 10 because version 20 supports all of the devices (and more) supported by version 10. The disclosed method, explores the shadowed space instead of disregarding it. In the event an installation package is completely shadowed (i.e., no device will receive it), it may be removed from the configuration (e.g., repository). A new installation package that completely shadows an installation package in the repository may receive an indication that the new installation package will completely shadow an existing installation package as disclosed herein.

As another example, a user may have version 10 of an application that is optimized for ARM processors. The user's device, however, may utilize an x86 processor that heretofore was non-existent. The x86 processor is capable of emulating an ARM processor instruction set, but the compatibility provided by the emulation is at the expense of efficiency of the x86 processor (as compared to an ARM processor running the ARM version of the application corresponding to the installation package). However, a developer of the application may attempt to publish an x86 version of the application with a version number of 1. Because the user's device already has version 10 of the application, it will be unable to downgrade to version 1, which supports the x86 instruction set. This is an example of native platform inversion. The disclosed method would encourage a developer to ensure the x86 version has a higher version code (e.g., 20) than the ARM version so that a user with the ARM version of the application will be offered an upgrade for the user's x86 device to the application version that is native to the x86 platform.

Figure 3:
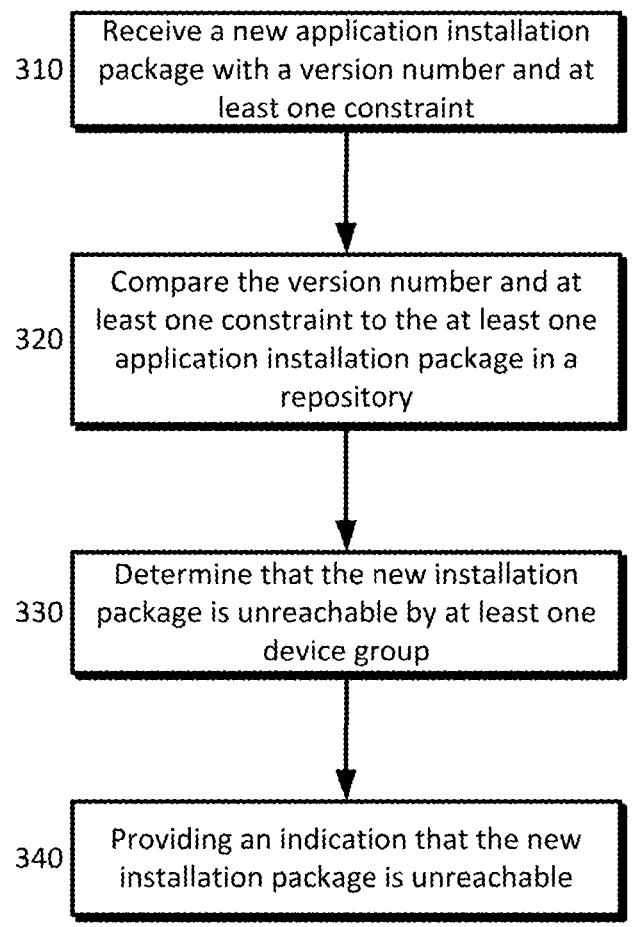
FIG. 3 is an example method for preventing a new application installation package from being unreachable by at least one device group to which it is directed according to an implementation.

In an implementation, a new application installation package may be received by an application repository at 310 as shown by the example provided in FIG. 3. An application repository may refer to any hardware and software configured to store one or more application installation packages for one or more applications. An application repository may refer to an "application store." The new application installation package may refer to software components necessary to install an application on a device such as a tablet or smartphone.

The new application installation package may have a version number and at least one constraint for an application. A version number may be provided by a developer. For example, an application repository may contain versions 10, 15, and 20 for an application, XYZ. A new application installation package may be assigned a version number by the developer that is not identical to the existing version numbers in the application repository. A constraint may refer to a device feature, an API level, an operating system, and/or a processor type. For example, a device feature may refer to circuitry or hardware that a device contains (e.g., a native platform) such as a camera, a touchscreen, a screen resolution, a Bluetooth chipset, a near-field communication chipset, or the like. A device feature may refer to a software feature such as an operating system and/or an API level. A processor type may be, for example, an x86, ARM5, RM7, or MIPS processor. A constraint may direct the new application installation package to at least one device group. For example, the new application installation package for application XYZ may have been developed for x86-based devices whereas all other application installation packages in the application repository for XYZ are for ARM7-based devices.

In some configurations, the new application installation package may contain an application identifier. The application identifier may be used to determine the application within the application repository with which an application installation package is to be associated. The application repository may be queried or searched with the application identifier when an application installation package is submitted using the application identifier associated with the new installation package.

Returning to FIG. 3, the version number and the at least one constraint of the new application installation package may be compared to the at least one application installation package in the application repository at 320. For example, the application repository may have versions 10, 15, and 20 for application XYZ and may be compared to an application installation package with application version number 17. Examples of a constraint may include a device feature, an API level, a processor, and/or an operating system version. In this example of API level inversion, version 17 may be directed to API levels for operating system version 10 and up while version 20 may be directed to API levels for operating system version eight and up. Thus, a device upgrading from API levels 8-9 to API levels 10 and up should receive version 17; but, the device would not be offered version 17 as an upgrade because that would represent a downgrade from version 20 which the device had previously received. This may ensure the user will receive the version of the application optimally suited for the user's device.

The new application installation package may be determined to be unreachable by at least one device group to which it is directed based on the comparison of the version number and the constraint of the new application package, to one or more application installation packages in the application repository at 330. A device group may refer to a collection of devices that are grouped together because each member of the group has a particular hardware or software configuration. For example, a device group may refer to a particular smartphone from a particular manufacturer where every device is identical to any other member of the device group. A device group may be a combination of hardware and software components; for example, any device running a particular operating system version and that has a five inch screen with a 1080p resolution and a quad-core processor. Continuing the example from above, because the new application installation package has a lower version number, application version 17, it may not be installable or "reached" by devices that have installed application version 20. That is, application version 17 may make use of upgraded APIs present in operating system versions ten and up for a particular subset of devices. A new application installation package may be unreachable by a device group to which it is directed because of a conflict such as an application downgrade, a shadowing of an installation package, an API level inversion, a native platform inversion, a loss of support for a type of device, and/or a reduction in the type of device supported. A type of device may refer to a particular hardware configuration, device manufacturer, and/or software configuration. A reduction of support may refer to an instance where a device can operate an installation package but it may not provide an optimal or complete performance. For example, a device may have reduced support where the processor has to emulate another processor type (e.g., a x86 processor emulating an ARM processor) in order to operate or execute an application.

An indication may be provided that the new installation package is unreachable by at least one device group to which it is directed at 340. The indication may refer to an error message that may be sent to a developer (e.g., an email, a text message, etc.). The indication may include a reason the installation package is deemed unreachable by a device group to which it is directed. Continuing the example above, the indication may be a message that informs the developer that version 17 will not be reachable by devices that have installed version 20 and are running operating system version ten, because this would represent a downgrade from version 20. The indication may include a suggestion of how to correct the error. For example, the indication may state that changing the version number of the new application installation package from 17 to 21 would prevent the version 20 installation package from shadowing the new application installation package. Such a situation may occur, for example, where the application store and associated devices are configured to prevent a device from accessing and/or installing a version of a previously-installed application that is lower than the installed version (e.g., to prevent an incompatible database downgrade). In this example, the device would be prevented from installing version 17 of the application because version 20 is already installed on the device, even though version 17 is optimized for higher API levels. In some configurations, the version number for the new installation package may be changed to a modified version number that eliminates the potential conflict. An indication of the change and/or the reason for the change may be provided, for example, to the developer who submitted the new application installation package. In some configurations, the new application installation package may be resubmitted with a modified version number that removes the potential conflict or an option to change the version number on the fly may be provided. For example, a developer may receive an indication of the potential conflict and a suggestion of a modified version number that would eliminate the potential conflict. If the developer accepts the suggestion, the version number of the new application installation package may be automatically modified. Alternatively, the version number may be automatically increased to a higher number, such as 21 or 30. Such a configuration may be used, for example, when it can be readily determined that the version numbering is the only issue preventing installation on the device group, and/or where it can be determined that changing the version number to a higher number will not cause additional conflicts as disclosed herein. As another example, the developer may instead enter a modified version number for the new application installation package. The modified version number may be evaluated for potential conflicts. Whether the version number is modified automatically or the new application installation package is resubmitted with a new version number, the new application installation package may be added to the application repository.

Figure 4:
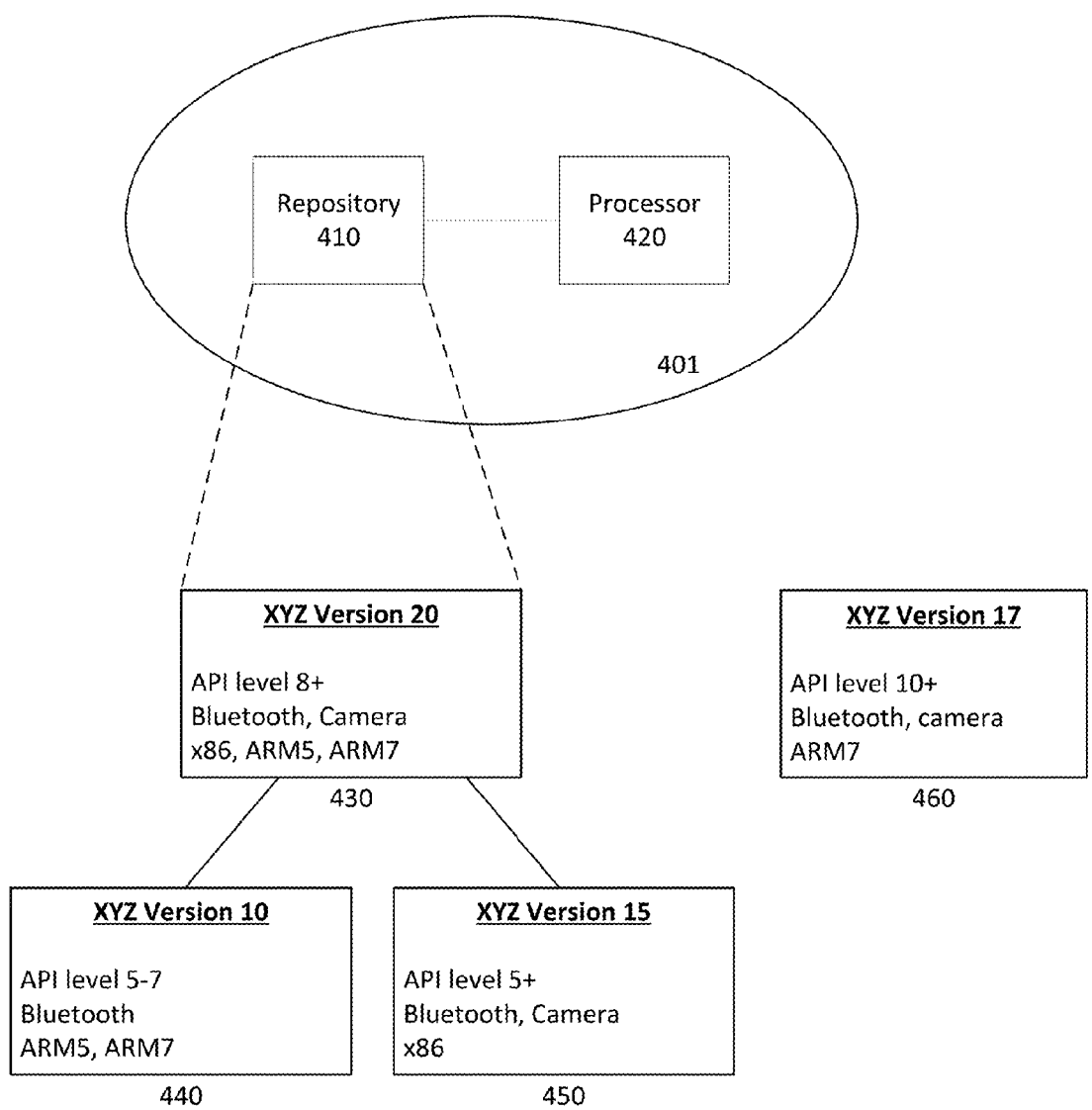
FIG. 4 is an example system for preventing a new application installation package from being unreachable by at least one device group to which it is directed according to an implementation disclosed herein.

In an implementation, a system is provided that includes a repository 410 and a processor 420 connected thereto as shown in the example provided in FIG. 4. Typically the application repository 410 is a database that may be accessed as a cloud service 401. The repository 410 may include one or more installation packages for one or more applications (e.g., 430, 440, 450).

For example, a given application in the repository may have several installation packages and each installation package for the application may be directed to a different device group or be a deprecated installation package. In the example shown in FIG. 4, the application XYZ has three versions in the repository 410. Version 20 430 is directed to an API level of eight and up and is constrained to devices that have Bluetooth, a camera, and an x86, ARM5, or ARM7 processor. Version 10 440 is directed to an API level of five to seven and is constrained to devices that have Bluetooth and an ARM5 or ARM7 processor. Version 15 450 is directed to an API level of five and up and is constrained to devices that have Bluetooth, a camera, and an x86 processor.

Each version of the application XYZ shown in the repository may correspond to a device group. For example, Version 10 440 is directed to devices that have an ARM processor and Bluetooth only. The intersection between the API levels of Version 20 430 and Version 15 440 may represent shadowed space because it is already accounted for by Version 20 430. That is, a device that has an API level of nine, Bluetooth capability, a camera, and an x86 processor will receive the upgrade to Version 20 430. However, a device that has an API level of six, Bluetooth capability, a camera, and an x86 processor will not receive the upgrade to Version 20 430 because it lacks the appropriate API level.

The processor 420 may be configured to receive a new application installation package 460 with a version number and one or more constraints for one of the applications in the repository 410. The one or more constraints may direct the new application installation package 460 to at least one device group as described above. The processor 420 may compare the version number and the at least one constraint of the new application installation package 460 to at least one application installation package related to the new application installation package 460 in the repository 410. The new application installation package 460 may be determined to be unreachable by at least one device group to which it is directed based on the comparison and the processor may be configured to provide an indication that the new application installation package is unreachable by at least one device group to which it is directed. Continuing the example, the version number for the new application installation package of XYZ 460 is 17. Version 17 may contain improvements for ARM7 devices that are running an API level of ten or greater. However, such devices that have installed Version 20 430 will not receive the upgrade to Version 17 460 because moving from version 20 to version 17 would be a downgrade (i.e., version 17 will be shadowed by Version 20) 430. The processor 420 may return an error message and/or a solution to the detected error as described earlier.

Figure 5:
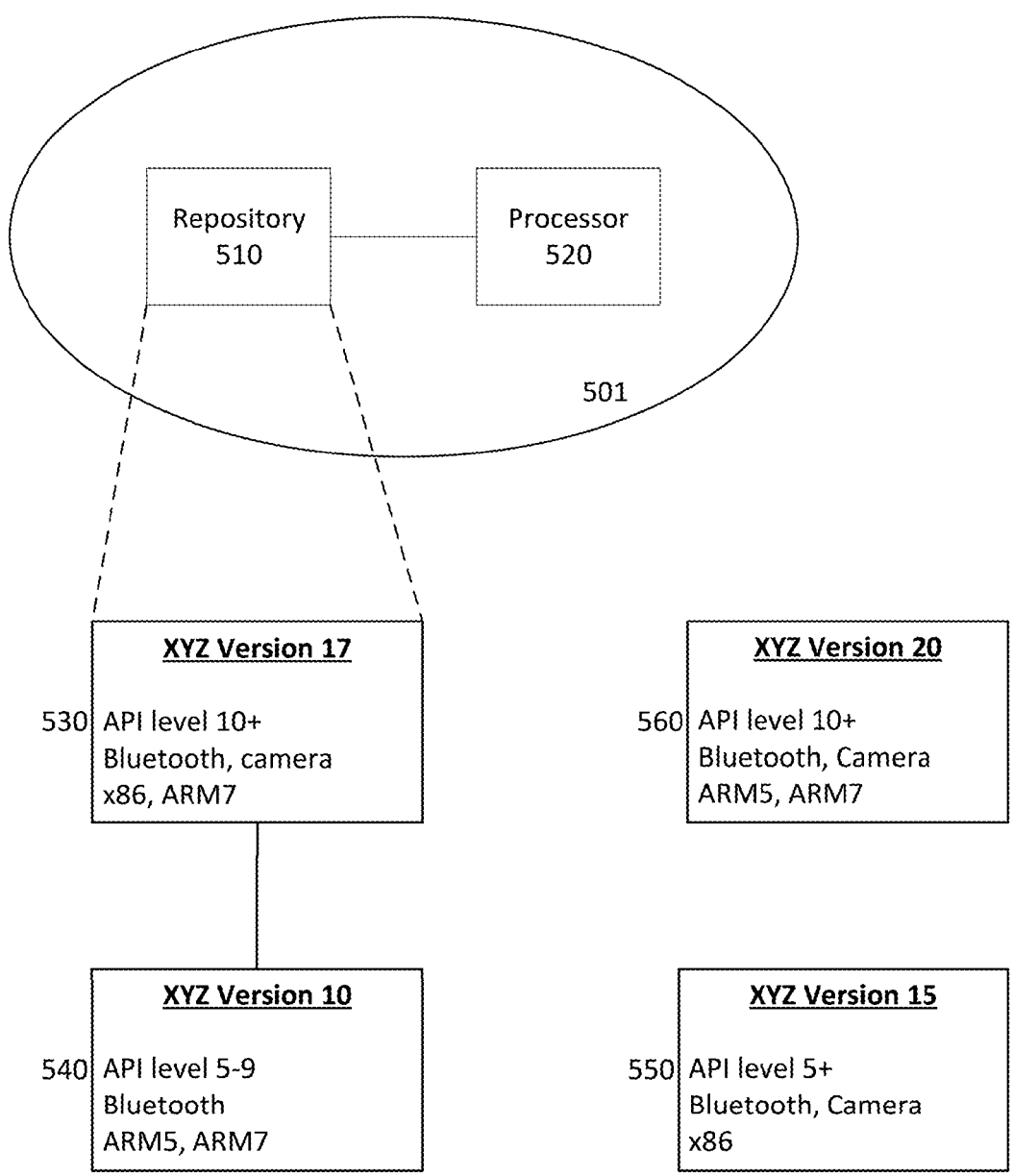
FIG. 5 is an example of an application downgrade as disclosed herein.

An example of an application downgrade is provided in FIG. 5. As described earlier, a system is provided that includes a repository 510 and a processor 520 connected thereto. The application repository 510 may be a database that may be accessed as a cloud service 501. The repository in this example includes two application installation packages for an application XYZ (i.e., 530, 540). Each installation package for the application XYZ may be directed to a different device group. Version 17 530 may contain improvements for ARM7 devices that are running an API level of eight or greater and may offer native support for the x86 platform. Version 10 540 is directed to an API level of five to nine and is constrained to devices that have Bluetooth and an ARM5 or ARM7 processor.

A developer may provide or activate two new installation packages for XYZ, version 20 560 and version 15 550, and simultaneously deactivate version 17 530. Devices that have an ARM processor, API level of 10 and up, and both Bluetooth and camera hardware will be upgraded to version 20 560 regardless of whether the devices are currently operating version 17 530 or version 10 540 of XYZ. However, a device currently running version 17 530 and that has an x86 processor, and an API level of 8 would be forced to downgrade from version 17 530 to version 15 550 because version 17 is no longer in the active configuration 550. As stated above, the processor 510 may determine that an application downgrade may occur if the developer deactivates version 17 530 and activates versions 15 550 and 20 560. In this example, the processor may inform the developer that users currently using version 17 530 will be moved onto a version of the application that is less optimized, version 15 550.

The tree, similar to the one depicted in FIG. 5 may be recursively validated using a process provided by the example code and description below. For example, a list of packages ordered by descending version code may be generated. A tag may be included in the list that indicates whether each installation package is from a "new" or "old" configuration. For example, when a developer uploads a new installation package, it may be deemed a "new" configuration whereas installation packages already existing in the repository may be deemed an "old configuration." Thus, the list generated from the installation packages (such as those shown in FIG. 5, 530, 540, 550, 560) may appear as follows:

```
20, [api(10+/allOf(BT,cam)/anyOf(ARM5,ARM7)], new)
17, [api(10+/allOf(BT,cam)/anyOf(x86,ARM7,{ARM5 implicitly})], old)
15, [api(5+/allOf(BT,cam)/anyOf(x86,{ARM7 implicitly},{ARM5 implicitly})], new)
10, [api(5-9/allOf(BT)/anyOf(x86,{ARM7 implicitly},{ARM5 implicitly})], new)
Validate(theList)
```

Device features are indicated by "BT" for Bluetooth capability and "cam" for camera. The statement "allof" refers to hardware requirements of the version. For example, version 20 requires that that devices possess both Bluetooth capability and a camera. Similarly, "anyOf" refers to compatible processors and indicates that any one of the listed processors is compatible. The "implicitly" comments may refer to instances where a processor may emulate or otherwise support or execute (e.g., run) the application or application installation package. The command Validate(theList) instructs a processor to validate the installation packages contained in the list. The processor may validate each version in the order of the list. The following example code may be utilized to recursively validate the installation packages:

```
Validate(theList, shadower, incomingConstraints):
    version = first version from theList
    constraints = constraintsOf(version)
    narrowedConstraints = constraints narrowedBy incomingConstraints
        if !isFeasible(narrowedConstraints)
            for nonMatch in nonMatches(constraints):
                Validate(theList minus version, shadower,
    incomingConstraints narrowedBy nonMatch)
        if shadower != null:
            if isFromOldConfiguration(shadower) and
            isFromNewConfiguration(version):
                reportDowngrade(shadower, version, narrowedConstraints)
            else:
                Validate(theList minus version, version, narrowedConstraints)
        else:
            // Validate shadowed space below this version
            Validate(theList minus version, version, narrowedConstraints)
            for nonMatch in nonMatches(constraints):
                // Validate non-shadowed space (i.e. the complement of each
    constraint from the shadowed space)
                Validate(theList minus version, shadower, incomingConstraints
    narrowedBy nonMatch)
```

The initial call may be Validate([20,17,15,10], null, { }). For example, version 20 would be evaluated as:

```
version=20
constraints=[api(10+) / allOf(BT,cam) / anyOf(ARM5,ARM7)]
narrowedConstraints=[api(10+) / allOf(BT,cam) / anyOf(ARM5,ARM7)]
narrowedConstraints is feasible.
shadower is null
```

The shadower for version 20 is null, meaning there are no installation packages that shadow version 20. Thus, the next version in the list would be evaluated. The next version to be evaluated is version 17 by the next call, Validate([17, 15, 10], 20, [api(10+)/allOf(BT,cam)/anyOf(ARM5,ARM7)]). Version 17 would be evaluated as:

```
version=17
constraints=[api(10+) / allOf(BT,cam) / anyOf(x86,ARM7,{ARM5 implicitly})]
narrowedConstraints=[api(10+) / allOf(BT,cam) / anyOf(ARM7,ARM5)]
narrowedConstraints is feasible.
shadower is 20
```

```
    nonMatches([api(10+) / allOf(BT,cam) / anyOf(x86,ARM7,{ARM5
        implicitly})])
= {
        api(*-9),
        noneOf(BT),
        noneOf(cam),
         noneOf(x86,ARM7,ARM5)
        }
    for nonMatch in nonMatches:
        Validated(theList minus version, shadower, incoming
Constraints narrowedBy nonMatch)
```

For version 17, installation package version 20 is a shadower (i.e., it shadows version 17). The version may be evaluated. Version 17 is from an old configuration. Thus, there is not an application downgrade scenario and none would be returned or otherwise indicated. The non-shadowed space may be validated; that is, the complement of each constraint from the shadowed space may be evaluated. Version 17 has constraints of an API level of 10 and up, Bluetooth, a camera, and any one of an x86, ARM5, or ARM7 processor. The complement, therefore, of each constraint indicates a class of devices which are unmatched. For an API level of 10 and up, the complement is API levels up through 9. For features Bluetooth and camera, the complement is a device lacking either. For native platforms, x86, ARM5, or ARM7, the complement is any native platform other than the aforementioned (e.g., MIPS). For version 20, the evaluation would appear as follows:

```
nonMatches([api(10+) / allOf(BT,cam) / anyOf(ARM5,ARM7)]) = {
    api(*-9),
    noneOf(BT),
    noneOf(cam),
    noneOf(ARM7,ARM5)
}
```

Continuing with version 20, it may be evaluated for non-Match in nonMatches as follows: Validate([17, 15, 10], shadower, incomingConstraints narrowedBy nonMatch [==nonMatch]). The shadower for version 20 is null (i.e., no installation packages shadow version 20). Likewise, the incoming constraints for version 20 is empty because no other installation package shadows version 20. The statement "nonMatch" may refer to configurations that do not match the constraints of version 20 (e.g., those that have an API level below 8).

Following the "noneOf(ARM7,ARM5)" branch as an example:

```
Validate([17,15,10], null shadower, noneOf(ARM7,ARM5)
incomingConstraints)
    version=17
    constraints=[api(10+) / allOf(BT,cam) / anyOf(x86,ARM7,{ARM5
    implicitly})]
    narrowedConstraints=[api(10+) / allOf(BT,cam) / anyOf(x86})]
```

At this stage, x86 processors are not excluded from the narrowed constraint, but ARM5 and ARM7 are excluded due to the incoming constraint "noneOf(ARM5, ARM7)" shown above. ARM7 processors are capable of emulating or running the instruction set of ARM5 based processors. Thus, the process would evaluate version 17 as:

```
    narrowedConstraints is feasible.
    shadower is null
``` and it would continue the recursive validation with version 15 as follows:

```
Validate([15, 10], 17, [api(10+) / allOf(BT,cam) / anyOf(x86})]):
    version=15
    constraints=[api(5+) / allOf(BT,cam) / anyOf(x86,{ARM7
    implicitly},{ARM5 implicitly})]
        narrowedConstraints=[apk(10+), allOf(BT,cam), anyOf(x86)]
        narrowedConstraints is feasible.
        shadower is 17.
```

In this case, version 17 is from an old configuration and 15 is from a new configuration. Therefore, an indication that version 15 would result in an application downgrade may be returned as follows:

reportDowngrade(17, 15, [api(10+), allOf(BT,cam), anyOf(x86)])

In the example described above, many of the non-match branches terminate quickly. For example, an API level of nine and below narrowedBy an API level of ten and up constraint yields a non-feasible narrowedConstraints.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
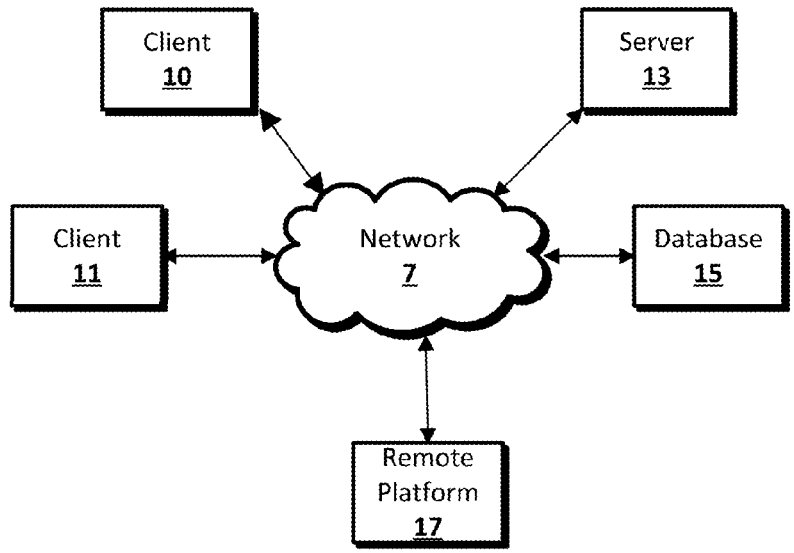
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method executable by a central processing unit (CPU), comprising:
   receiving, by an application repository, a new application installation package with a version number and at least one constraint for an application, wherein the at least one constraint directs the new application installation package to at least one device group, the application repository being accessible as a cloud service;
   comparing the version number and the at least one constraint of the new application installation package to at least one application installation package in the application repository;
   determining that the new application installation package is unreachable by at least one device group to which the new application installation package is directed based on the comparison of the version number and the at least one constraint of the new application installation package to the at least one application installation package in the application repository;
   providing an indication that the new application installation package is unreachable by at least one device group to which the new application installation package is directed, the indication including errors or warnings accumulated;
   recursively validating various levels of a tree corresponding to application package versions that are stored in the application repository and are to be published; and
   preventing addition of the new application installation package to the application repository.

2. The method of claim 1, wherein the new application installation package is unreachable by at least one device group to which the new application installation package is directed because of a potential conflict that is selected from the group consisting of: an application downgrade, a shadowing of an installation package, an API level inversion, a native platform inversion, a loss of support for a type of device, and a reduction in the type of device supported.

3. The method of claim 2, further comprising receiving the new application installation package with a modified version number, wherein the modified version number eliminates the potential conflict.

4. The method of claim 3, further comprising adding the new application installation package to the application repository, subsequent to receiving the new application installation package with the modified version number.

5. The method of claim 2, further comprising automatically changing the new application installation package version number to a modified version number, wherein the modified version number eliminates the potential conflict.

6. The method of claim 5, further comprising, subsequent to changing the new application installation package version number, adding the new application installation package to the application repository.

7. The method of claim 1, wherein a constraint is selected from the group consisting of: a device feature, an API level, an operating system version, and a processor type.

8. The method of claim 1, wherein the new application installation package contains an application identifier.

9. The method of claim 1, further comprising searching the application repository for the at least one application installation package related to the new application installation package based on the application identifier.

10. A system, comprising:
- an application repository comprising a plurality of application installation packages for a plurality of applications, the application repository being accessible as a cloud service:
- a processor connected to the repository, configured to:
  - receive a new application installation package with a version number and at least one constraint for one of the plurality of applications, wherein the at least one constraint directs the new application installation package to at least one device group;
  - compare the version number and the at least one constraint of the new application installation package to at least one application installation package related to the new application installation package in the repository;
  - determine that the new application installation package is unreachable by at least one device group to which the new application installation package is directed based on the comparison of the version number and the at least one constraint of the new application installation package to the at least one application installation package in the repository; and
  - provide an indication that the new application installation package is unreachable by at least one device group to which the new application installation package is directed, the indication including errors or warnings accumulated;
  - recursively validate various levels of a tree corresponding to application package versions that are stored in the application repository and are to be published; and
  - prevent addition of the new application installation package to the application repository.

11. The system of claim 10, wherein the new application installation package is unreachable by at least one device group to which the new application installation package is directed because of a potential conflict that is selected from the group consisting of: an application downgrade, a shadowing of an installation package, an API level inversion, a native platform inversion, a loss of support for a type of device, and a reduction in the type of device supported.

12. The system of claim 11, the processor further configured to receive the new application installation package with a modified version number, wherein the modified version number eliminates the potential conflict.

13. The system of claim 12, the processor further configured to add the new application installation package to the application repository, subsequent to receiving the new application installation package with the modified version number.

14. The system of claim 10, the processor further configured to automatically change the new application installation package version number to a modified version number, wherein the modified version number eliminates the potential conflict.

15. The system of claim 14, the processor further configured to, subsequent to changing the new application installation package version number, add the new application installation package to the application repository.

16. The system of claim 10, wherein a constraint is selected from the group consisting of: a device feature, an API level, and a processor type.

17. The system of claim 10, wherein the new application installation package contains an application identifier.

18. The system of claim 17, the processor further configured to search the application repository for the at least one application installation package related to the new application installation package based on the application identifier.

* * * * *